(12) United States Patent
Shimizu

(10) Patent No.: US 6,460,862 B1
(45) Date of Patent: Oct. 8, 2002

(54) CHUCK WITH ROTARY VANE ACTUATOR

(76) Inventor: Tokichi Shimizu, 107-2, 2 Umedacho, Kiryu-Shi, Gunma-Ken (JP)

( * ) Notice: Subject to any disclaimer, the term of this patent is extended or adjusted under 35 U.S.C. 154(b) by 123 days.

(21) Appl. No.: 09/678,148

(22) Filed: Oct. 3, 2000

(30) Foreign Application Priority Data

Oct. 6, 1999 (JP) .......................................... 11-285883

(51) Int. Cl.[7] .............................................. B23B 31/30
(52) U.S. Cl. ...................... 279/4.12; 91/189 A; 91/520; 92/67; 279/132
(58) Field of Search ............................... 279/4.12, 4.01, 279/4.1, 4.11, 4.04, 132, 133, 135; 91/168, 189, 520; 92/67

(56) References Cited

U.S. PATENT DOCUMENTS

| | | | | |
|---|---|---|---|---|
| 2,751,230 A | * | 6/1956 | Korber | 279/4.12 |
| 2,890,889 A | * | 6/1959 | Work | 279/4.12 |
| 3,516,680 A | * | 6/1970 | Andre | 279/4.12 |
| 3,698,729 A | * | 10/1972 | Scharfen et al. | 279/4.02 |
| 3,892,419 A | * | 7/1975 | Jackson et al. | 279/4.12 |
| 3,904,214 A | * | 9/1975 | Manchester | 279/132 |
| 3,975,030 A | * | 8/1976 | Akeel et al. | 279/4.12 |
| 4,070,935 A | * | 1/1978 | Caprioli | 279/4.12 |
| 4,718,682 A | | 1/1988 | Zilic et al. | |
| 5,785,325 A | * | 7/1998 | Daetwyler | 279/4.01 |
| 5,957,466 A | * | 9/1999 | Van Mullekom | 279/4.12 |
| 6,089,577 A | | 7/2000 | Takada et al. | |

* cited by examiner

Primary Examiner—Steven C. Bishop
(74) Attorney, Agent, or Firm—Christensen O'Connor Johnson Kindness pllc

(57) ABSTRACT

There is provided a chuck having four radial jaw grooves, two pairs of opposed jaws movably provided in the grooves, a first rotary vane actuator for actuating one pair of the opposed jaws, and a second rotary actuator for actuating the other pair of the opposed jaws, an inlet for admitting fluid into chambers of the actuators, and an outlet for discharging fluid from the chambers. The first and second vane actuators are opearated by the fluid admitted from the one inlet such that the two pairs of opposed jaws are differentially actuated by said first and second rotary vane actuators. The first rotary vane actuator includes a first pressure chamber and the second rotary vane actuator includes a second pressure chamber, in which the first and second pressure chambers are in fluid communication via at least one fluid-conducting path.

21 Claims, 17 Drawing Sheets

CHUCK WITH ROTARY VANE ACTUATOR

FIELD OF THE INVENTION

This invention relates to a chuck assembly, and more particularly to a chuck with four jaws actuated by a rotary vane actuator.

BACKGROUND OF THE INVENTION

The chuck of the prior art generally comprises three or four radially movable clamping jaws. Common problems of this kind of chuck are described in U.S. Pat. No. 4,718,682 issued to Zilic, et al. and U.S. Pat. No. 6,089,577 issued to Takada, et al, for example. Zilic patent relates to a chuck that is driven by a complex mechanical arrangement. Takeda patent discloses a two-drive-system fluid pressure chuck including two sets of jaw members capable of chucking a workpiece from two orthogonal directions. The chuck includes two cylinder apparatuses, a first rod, a second rod, and a cam member. The first rod is slidably disposed within the inside of the second rod.

When two sets of jaw members are actuated independently, the clamping by one set of jaw members may be influenced by the other set of jaw members that have already fixed the workpiece. Centering of the one set of jaw members cannot be achieved if the workpiece is fixed by the other set of jaw members.

In addition, in accordance with the chuck with a fluid actuator having an axial movement of piston rod, displacement of clamping jaws is limited by the stroke of the piston rod. A longer stroke of the piston rod results in a larger size of the chuck body.

The present invention seeks to preclude many of these problems.

An object of the present invention is to provide a chuck that is capable of holding a workpiece accurately.

Another object of the present invention is to provide a compact chuck with a simple construction.

SUMMARY OF THE INVENTION

There is provided a chuck having four radial jaw grooves, two pairs of opposed jaws movably provided in the grooves, a first rotary vane actuator for actuating one pair of the opposed jaws, and a second rotary actuator for actuating the other pair of the opposed jaws, an inlet for admitting fluid, and an outlet for discharging fluid. The first and second vane actuators are operated by the fluid admitted from the one inlet such that the two pairs of opposed jaws are differentially actuated by said first and second rotary vane actuators.

According to one feature of the invention, the first rotary vane actuator includes a first pressure chamber and the second rotary vane actuator includes a second pressure chamber, in which the first and second pressure chambers are in fluid communication via at least one fluid-conducting path.

According to the other feature of the invention, the first rotary vane actuator and the second rotary vane actuator share a common pressure chamber.

BRIEF DESCRIPTION OF THE DRAWINGS

These and other objects and advantages of the invention, as well as the details of an illustrative embodiment, will be more fully understood from the following specification and drawings, in which.

DESCRIPTION OF THE PREFERRED EMBODIMENTS

Figure 1A:
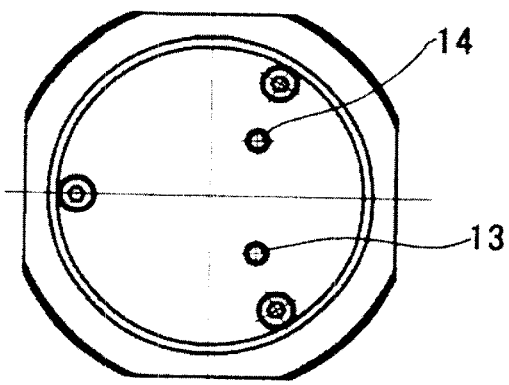
FIG. 1(a) shows a plan view of a chuck with four jaws.
Figure 1B:
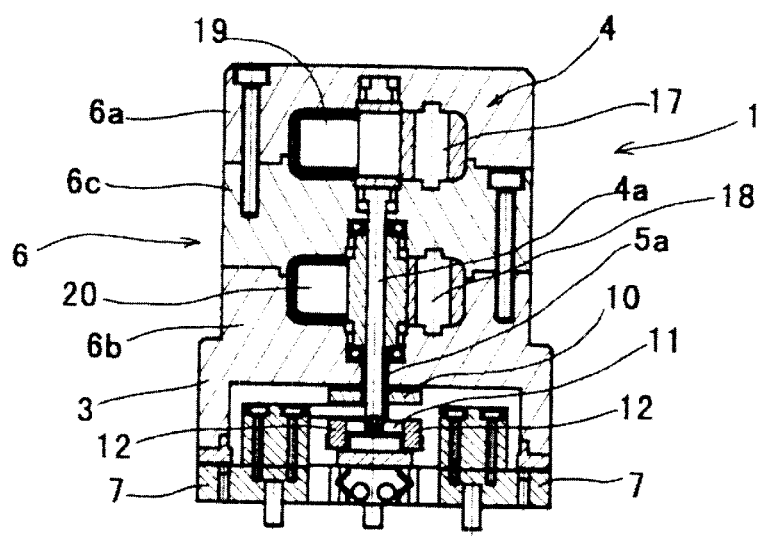
FIG. 1(b) shows a cross sectional view thereof.
Figure 1C:
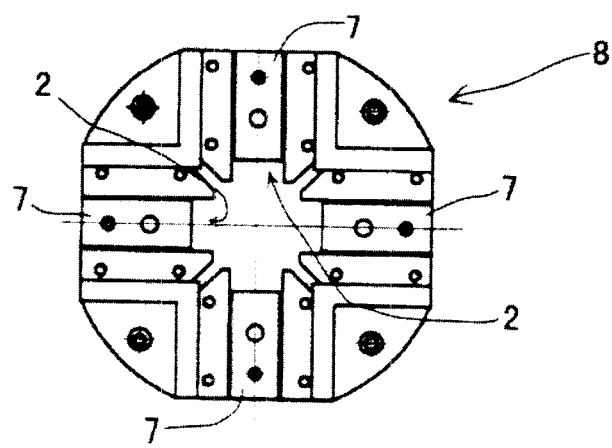
FIG. 1(c) shows a bottom view thereof.

Referring to FIG. 1 through FIG. 5, a chuck assembly 1 comprises a chuck body 3 having a front face and a rear side, and a casing 6 that is provided at the rear of the chuck body 3. Four jaw grooves 2 are diametrically provided on the front face of the chuck body 3. Two pairs of opposed jaws 7 are slidably provided in the jaw grooves 2 so that two pairs of jaws can chuck a workpiece from orthogonal directions. A first rotary vane actuator 4 and a second rotary vane actuator 5 are housed in the casing 6. The construction of this kind of rotary vane actuator itself is widely known.

The first vane actuator 4 has a longer vane shaft 4a, a vane 19 that is provided at an upper portion of the vane shaft 4a, a first cylindrical pressure chamber 4b and a first stopper 17. The vane 19 and the stopper or stator 17 together partition the pressure chamber 4b into two rooms. The rooms are respectively provided with ports 13, 14 that are provided in the wall of the casing 6. The second vane actuator 5 has a shorter vane shaft 5a, a vane 20 that is provided at an upper portion of the vane shaft 5a, a second cylindrical pressure chamber 5b and a second stopper 18. The vane 20 and the stopper 18 or stator together to partition the pressure chamber 5b into two rooms. The vane shaft 4a has a smaller diameter and the vane shaft 5a has a larger diameter so that the vane shaft 4a is rotatably received in a hollow portion of the vane shaft 5a.

A jaw driving mechanism 8 that is provided in the chuck body 3 drives two pairs of opposed jaws 7. The jaw driving mechanism 8 includes two disc cams 10,11, each having opposite engaging cutouts 9 provided in the perimeters thereof. The vane shafts 4a, 5a are coaxially provided at an intersection of two hypothetical lines between the cutouts 9. Each jaw 7 has a pin 12 that is projected from the rear of the jaw. Each pin 12 engages the cutout 9 so that rotations of the vane shafts 4a, 5a drive two pairs of jaws 7 to move along the jaw grooves 2.

The casing 6 comprises an upper case portion 6a, a lower case portion 6b, and an intermediate case portion 6c. The upper case portion 6a is provided with the ports 13, 14 that form an inlet for admitting fluid to the room of pressure chamber 4b and an outlet for discharging fluid from the room of pressure chamber 4b. The lower case portion 6b is integrally provided with the chuck body 3. The upper and lower case portions 6a, 6b are coaxially connected via the intermediate case portion 6c. The first cylindrical pressure chamber 4b for the first rotary vane actuator 4 is provided between the lower surface of the upper case portion 6a and the upper surface of the intermediate case portion 6c. The second cylindrical pressure chamber 5b for the second rotary vane actuator is provided between the lower surface of the intermediate case portion 6c and the upper surface of the lower case portion 6b.

Two fluid-conducting paths or ducts 15, 16 are provided in the body of the intermediate case portion 6c so that pressure chambers 4b, 5b are in fluid communication via the paths 15, 16. The two rooms of the first pressure chamber 4b and the two rooms of the second pressure chamber 5b are in fluid communication respectively via the paths 15, 16. The fluid such as hydraulic or air pressure is introduced from either one of the ports 13, 14 to the partitioned room of the pressure chamber 4b of the first vane actuator 4, then the fluid is introduced into the pressure chamber 5b of the second vane actuator 5 through the either one of the paths 15, 16.

The fluid introduced from either of the ports 13, 14 into the partitioned rooms of the pressure chambers 4b, 5b operates to push the vanes 19 to rotate the vane shafts 4a, 5a.

Figure 2A:
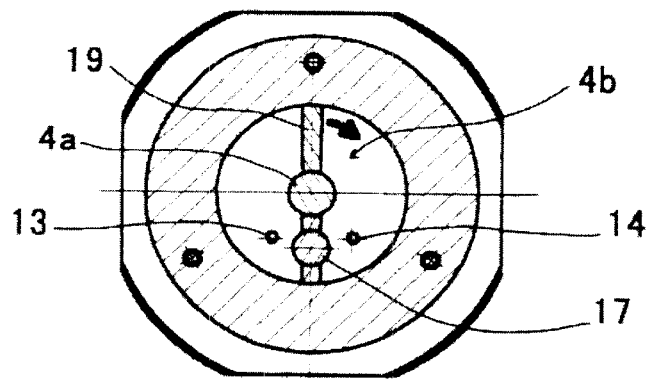
FIG. 2(a) is a cross sectional view taken along line A—A of FIG. 2(b)
Figure 2B:
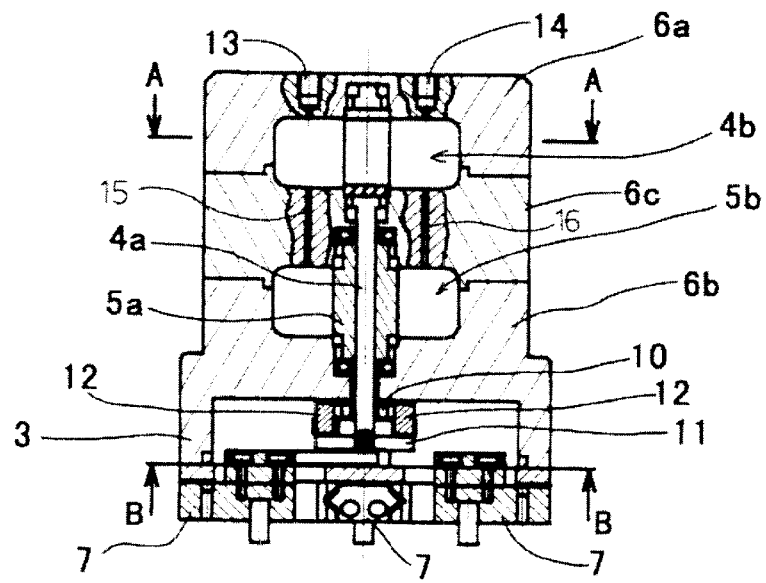
FIG. 2(b) is a vertical sectional view of the chuck.

When the pressure oil is introduced from the port 13 into the one of the partitioned rooms of the pressure chamber 4b, the vane 19 of the first rotary vane actuator 4 rotates about an longitudinal axis of the vane shaft 4a in the direction of arrow in FIG. 2(a) and the vane shaft 4a rotates in the direction of arrow. Thus, the disc cam 11 provided at the distal end of the vane shaft 4a rotates in the direction of arrow in FIG. 2(c). Then, the pair of jaws 7 in the lateral direction moves toward to each other so that the clamping portions (not shown) attached to the jaws 7 contact the workpiece.

By continuously introducing fluid into the partitioned room between the stopper 17 and the vane 19 that has moved to where the jaws 7 in the lateral direction contact the workpiece, the fluid is introduced into the pressure chamber 5b of the second rotary vane actuator 5 through the path 15,16. At this stage, the opposite jaws 7 in the lateral direction of FIG. 2(c) contact the workpiece but the clamping force has not been exerted.

Figure 2C:
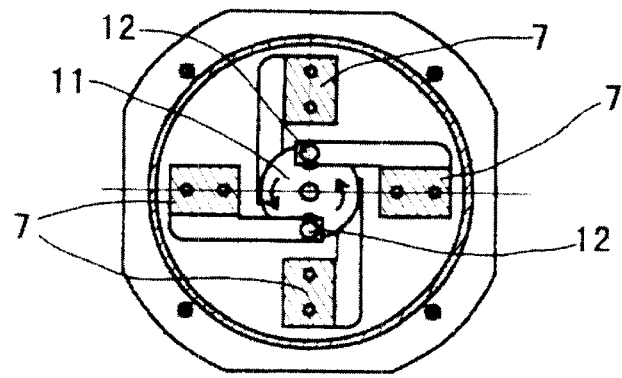
FIG. 2(c) is a cross sectional view taken along line B—B of FIG. 2(b)
Figure 3A:
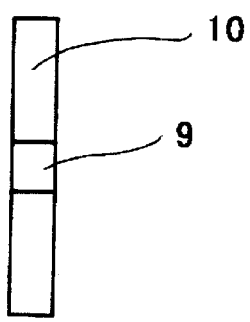
FIG. 3(a) is a side view of a disc cam.
Figure 3B:
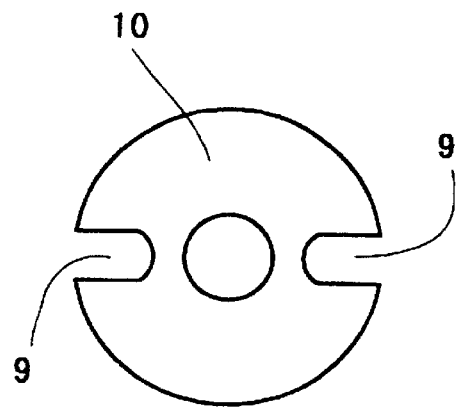
FIG. 3(b) is a plan view of the cam in FIG. 3(a)
Figure 3C:
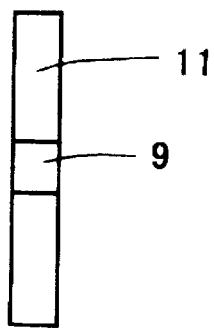
FIG. 3(c) is a side view of another disc cam.
Figure 3D:
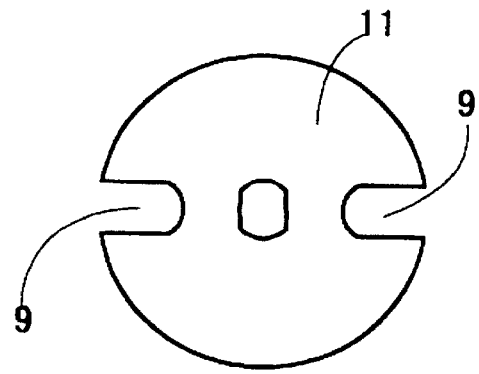
FIG. 3(d) is a plan view of the cam in FIG. 3(c)
Figure 4A:
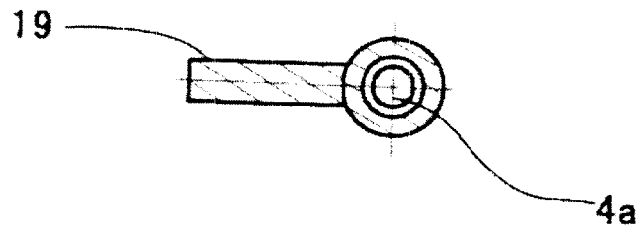
FIG. 4(a) is a cross sectional view of a first vane and a first shaft seen from the top.
Figure 4B:
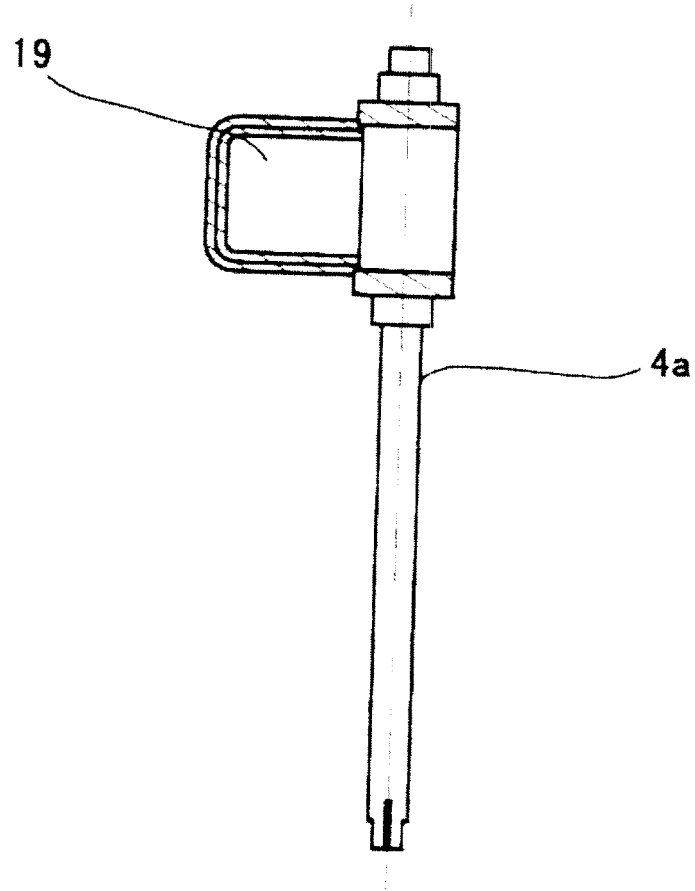
FIG. 4(b) is a front view thereof partly in section.
Figure 4C:
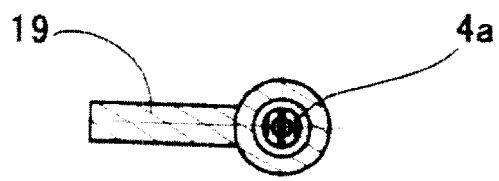
FIG. 4(c) is a cross sectional view thereof seen from the bottom.
Figure 5A:
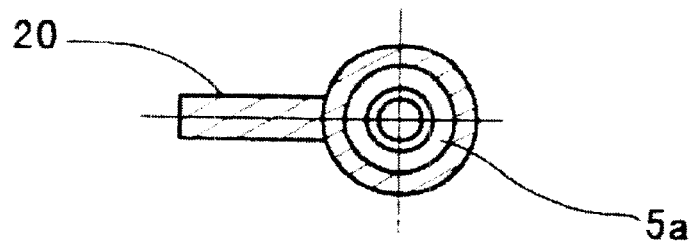
FIG. 5(a) is a cross sectional view of a second vane and a second shaft seen from the top.
Figure 5B:
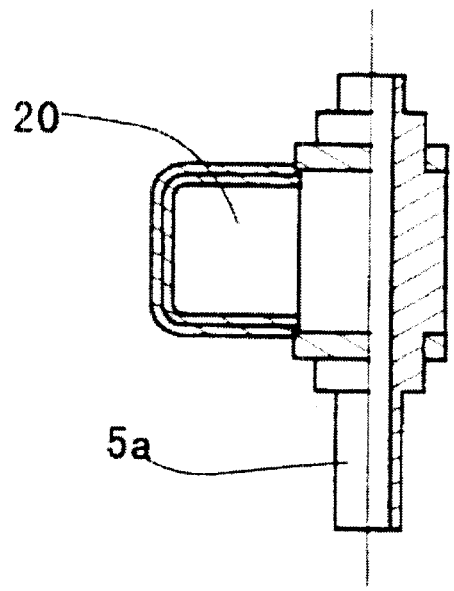
FIG. 5(b) is a front view thereof partly in section.
Figure 5C:
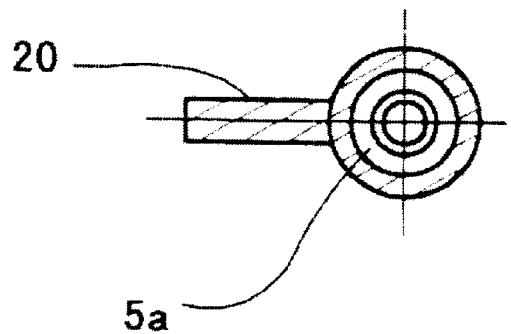
FIG. 5(c) is a cross sectional view thereof seen from the bottom.

When the fluid is introduced into the pressure chamber 5b of the second rotary vane type actuator 5, the rotating vane 20 forces the disc cam 10 provided at the distal end of the vane shaft 5a to rotate, thereby moving the opposite jaws in the vertical direction of the FIG. 2(c) toward to each other via the pins 12 that engage the cutouts 9 of the disc cam 10. When clamping portions (not shown) attached at the front sides of the opposite jaws 7 in the vertical direction contact the workpiece, high fluid pressure is now exerted in the pressure chambers 4b, 5b by continuous fluid so that the workpiece can be fixed by strong clamping force exerted between the two pairs of opposite jaws 7. The work can be released from the clamped position by discharging the fluid from the former inlet port 13 and/or introducing the fluid from the other port 14 to actuate the jaws away from each other.

In accordance with the present invention, each pair of opposed jaws can move differentially to each other so that the chuck is cable of holding a workpiece of any shape without an initial location of the chuck. Though the inlet and outlet ports 13, 14 are both provided in the first pressure chamber 4b in the illustrated embodiments, the locations of ports are not limited to the embodiments. The inlet port can be provided in the first pressure chamber while the outlet port can be provided in the second pressure chamber, and vice versa.

Figure 6A:
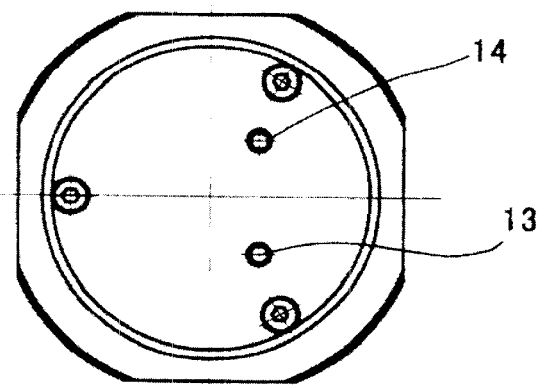
FIG. 6(a) is a plan view of chuck showing another embodiment of jaw driving mechanism.
Figure 6B:
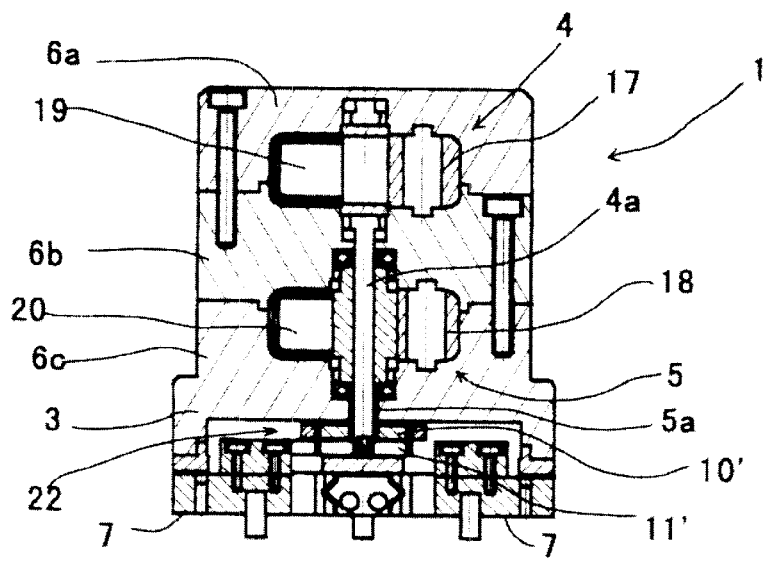
FIG. 6(b) is a cross sectional view thereof.
Figure 6C:
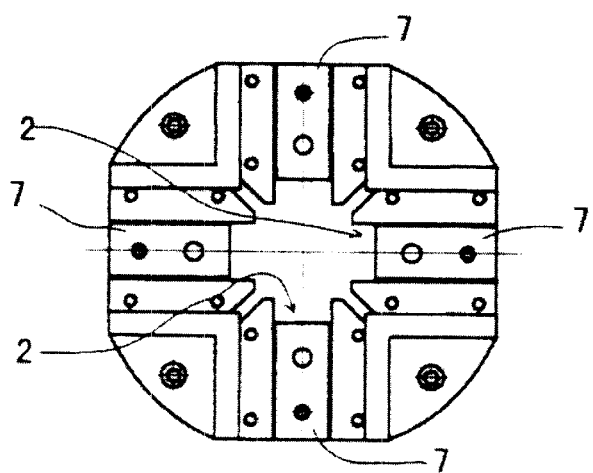
FIG. 6(c) is a bottom view thereof.
Figure 7A:
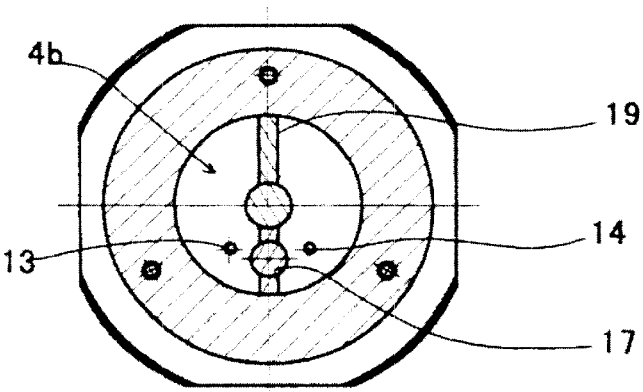
FIG. 7(a) is a cross sectional view taken along line C—C of FIG. 7(b)
Figure 7B:
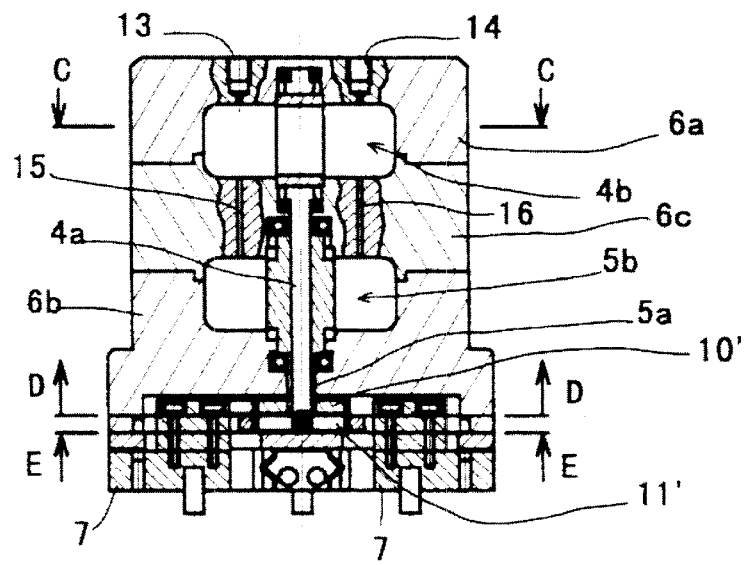
FIG. 7(b) is a cross sectional view of the chuck.
Figure 7C:
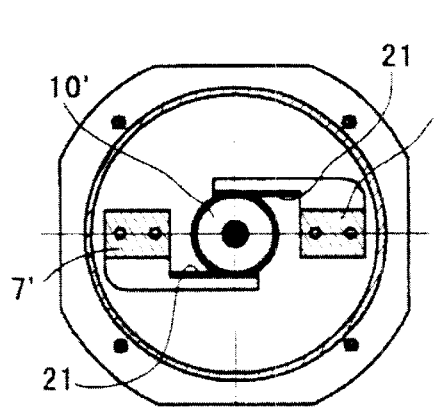
FIG. 7(c) is a cross sectional view taken along line D—D of FIG. 7(b)
Figure 7D:
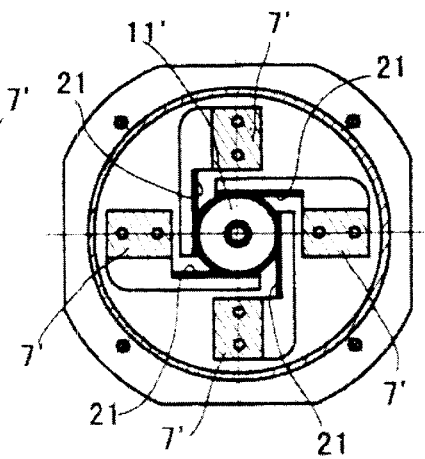
FIG. 7(d) is a cross sectional view taken along line E—E of FIG. 7(b)
Figures 8A, 8B:
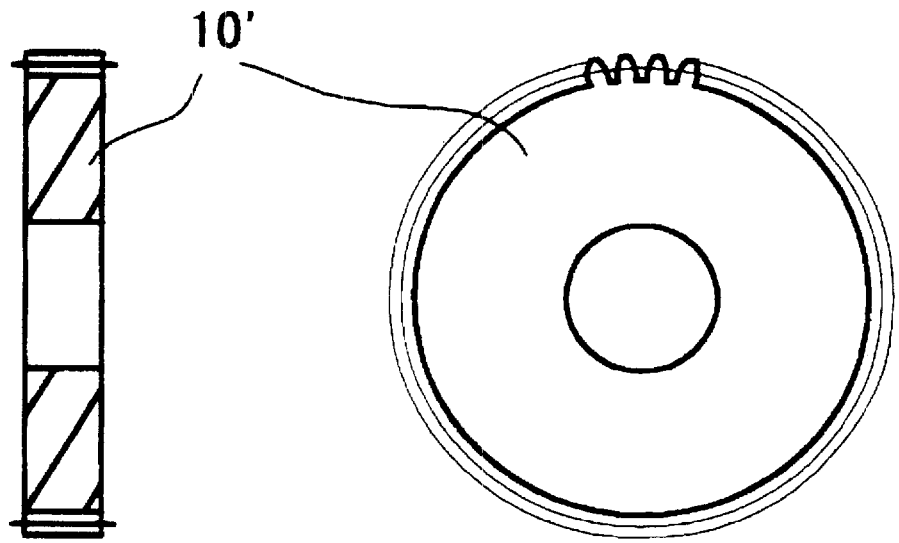
FIG. 8(a) is a cross sectional view of a spur gear.
FIG. 8(b) is a plan view thereof.
Figures 8C, 8D:
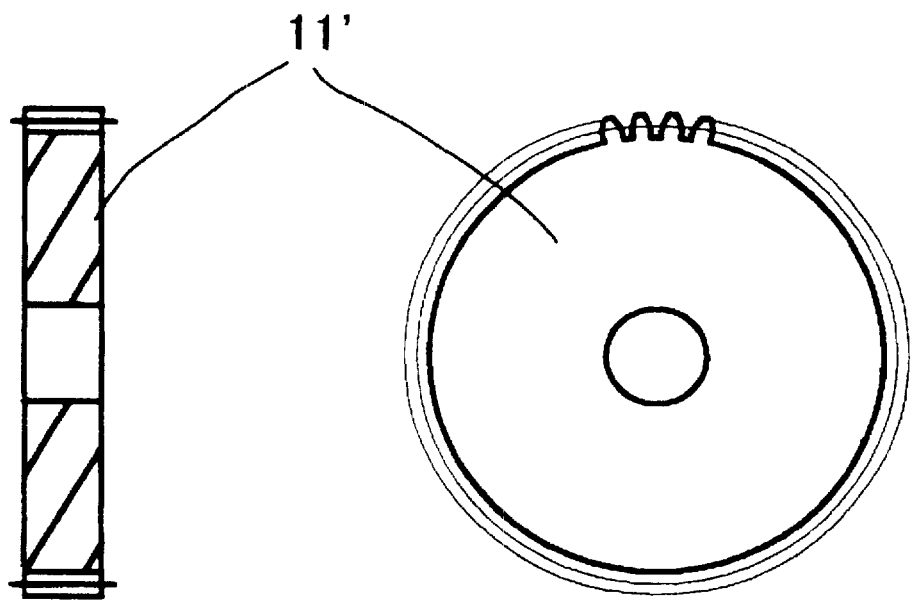
FIG. 8(c) is a cross sectional view of another spur gear.
FIG. 8(d) is a plan view thereof.

Referring to FIG. 6 through FIG. 8, another embodiment of the jaw driving mechanism 22 is shown. Instead of having the disc cams 10, 11, two spur gears 10', 11' are coaxially provided at the distal ends of vane shafts 4a, 5a of the first and second rotary vane actuators. Two pairs of opposed jaws 7'; 7' include rack gear portions 21 that engage the spur gears 10', 11' respectively. When the vane shafts 4a, 5a rotate, two pairs of opposed jaws 7', 7' are driven via the spur gears 10', 11' and the rack gears 21. In accordance with this embodiment, accurate clamping of the workpiece can be obtained.

Figure 9A:
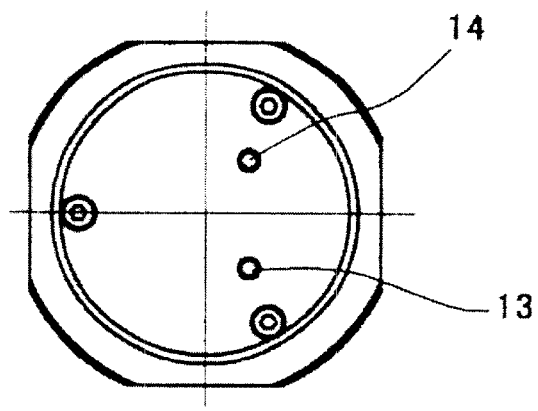
FIG. 9(a) is a plan view of chuck showing still another embodiment of jaw driving mechanismc.
Figure 9B:
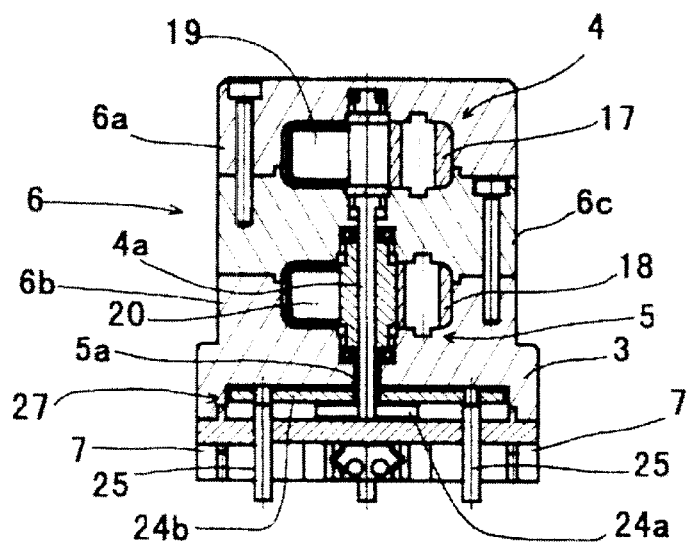
FIG. 9(b) is a cross sectional view thereof.
Figure 9C:
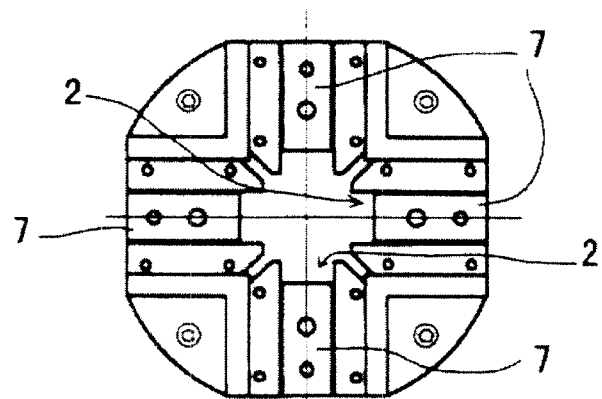
FIG. 9(c) is a bottom view thereof.
Figure 10A:
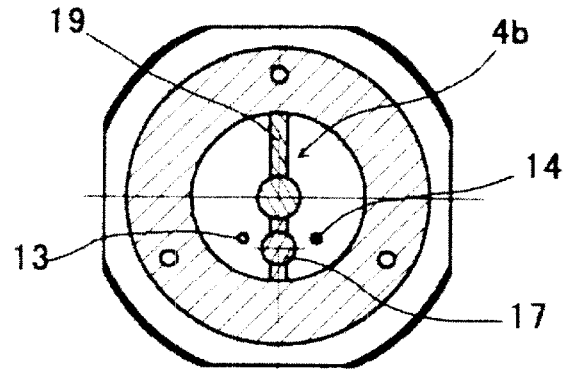
FIG. 10(a) is a cross sectional view taken along line F—F of FIG. 10(b)
Figure 10B:
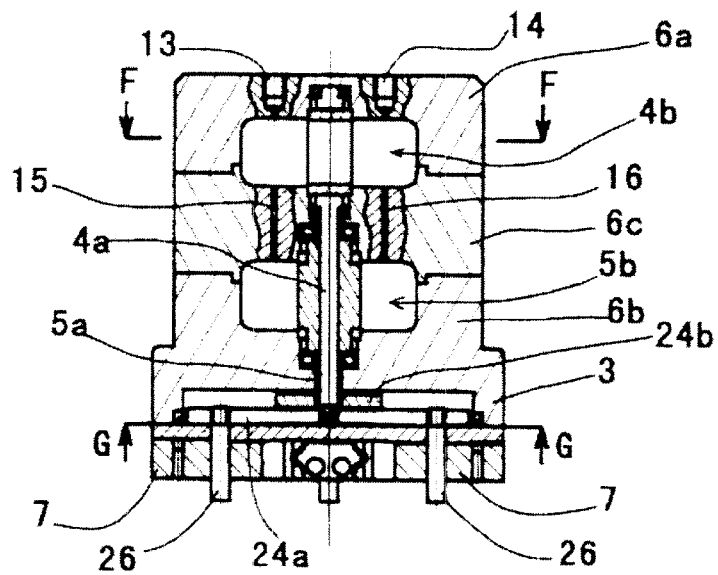
FIG. 10(b) is a cross sectional view of the chuck.
Figure 10C:
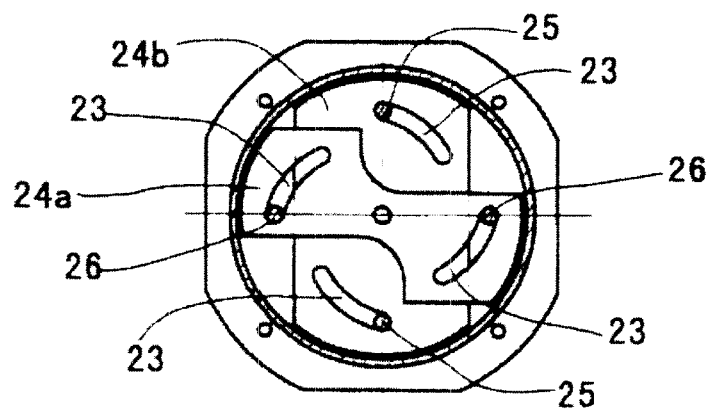
FIG. 10(c) is a cross sectional view taken along line G—G of FIG. 10(b)
Figure 11A:
FIG. 11(a) is a side view of a rotating plate.
Figure 11B:
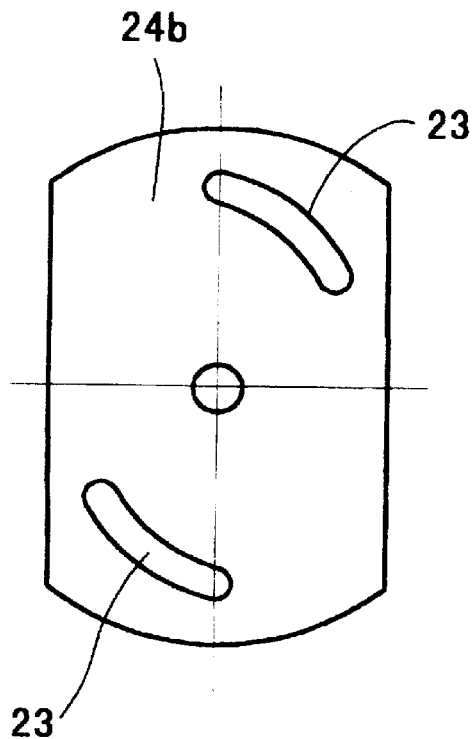
FIG. 11(b) is a plan view thereof.
Figure 11C:
FIG. 11(c) is a side view of another rotating plate.
Figure 11D:
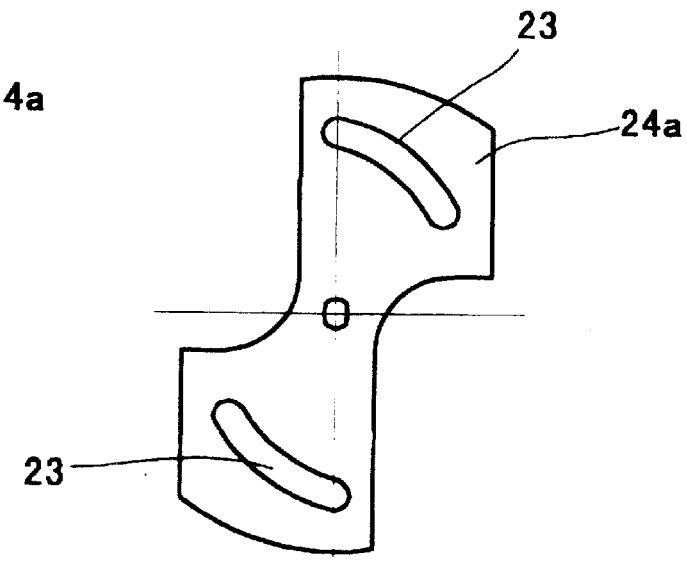
FIG. 11(d) is a plan view thereof.
Figure 12A:
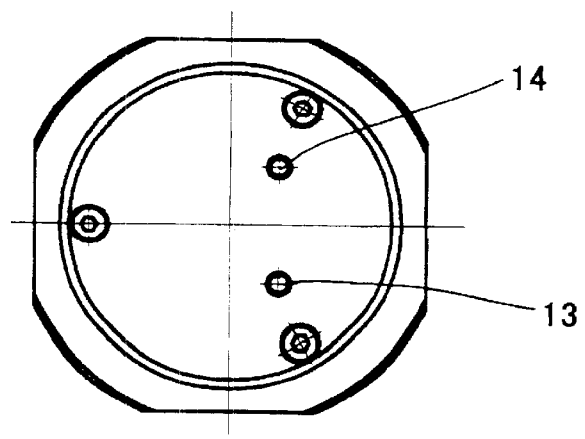
FIG. 12(a) is a plan view showing another embodiment of pressure chamber.
Figure 12B:
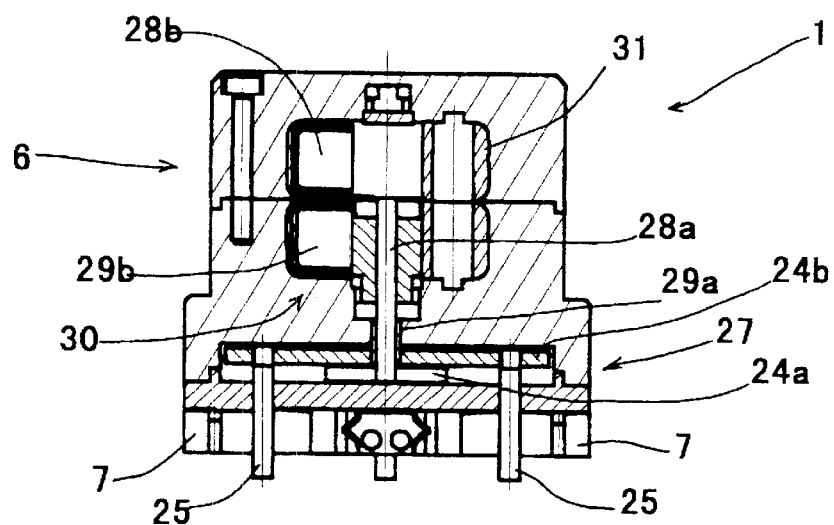
FIG. 12(b) is a cross sectional view thereof.
Figure 12C:
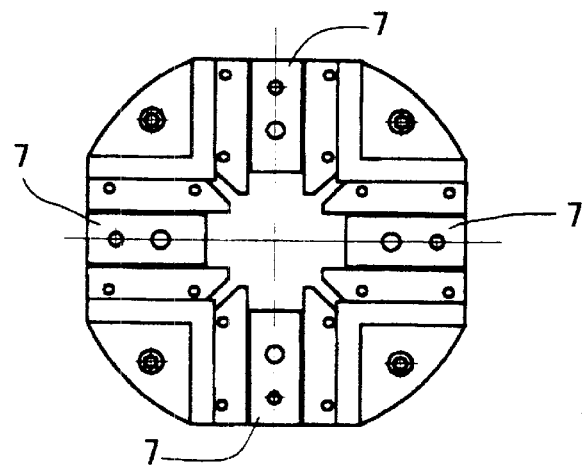
FIG. 12(c) is a bottom view thereof.
Figure 13A:
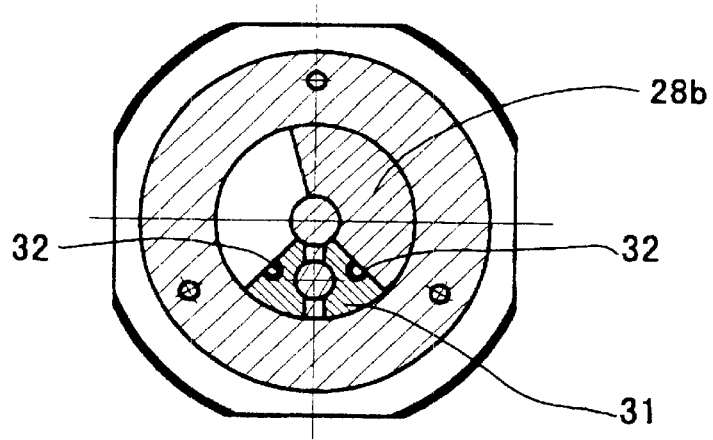
FIG. 13(a) is a cross sectional view taken along line H—H of FIG. 13(b)
Figure 13B:
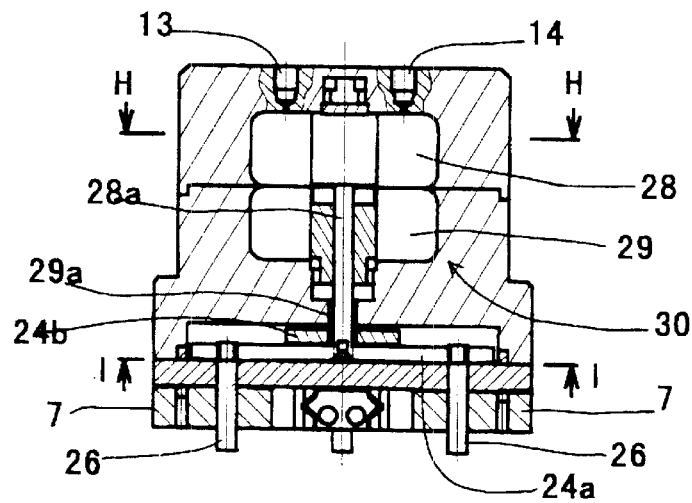
FIG. 13(b) is a cross sectional view of the chuck.
Figure 13C:
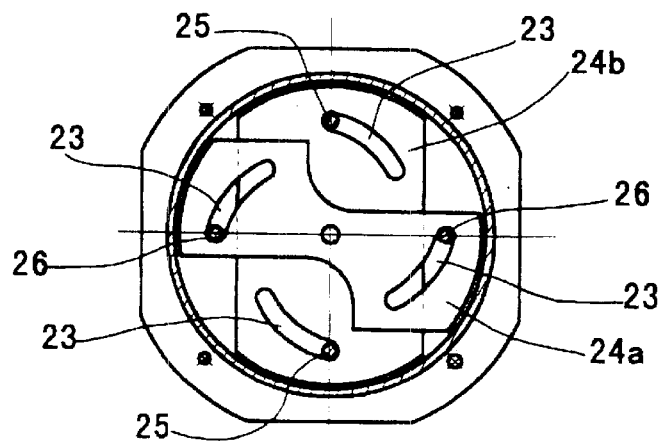
FIG. 13(c) is a cross sectional view taken along line I—I of FIG. 13(b)
Figure 14A:
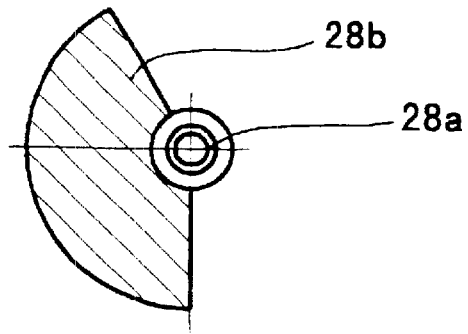
FIG. 14(a) is a cross sectional view of a first vane and a first shaft seen from the top.
Figure 14B:
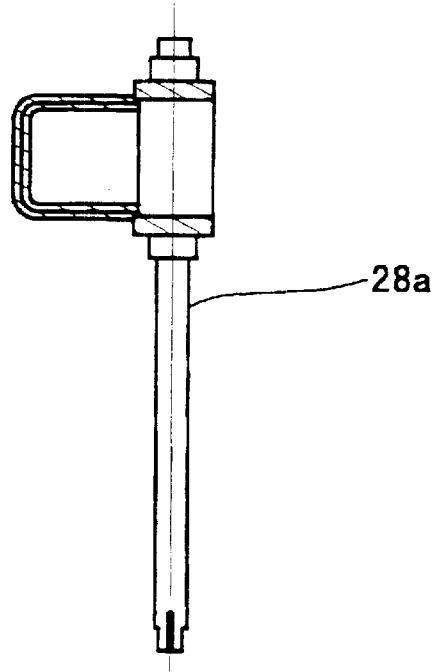
FIG. 14(b) is a front view thereof partly in section.
Figure 14C:
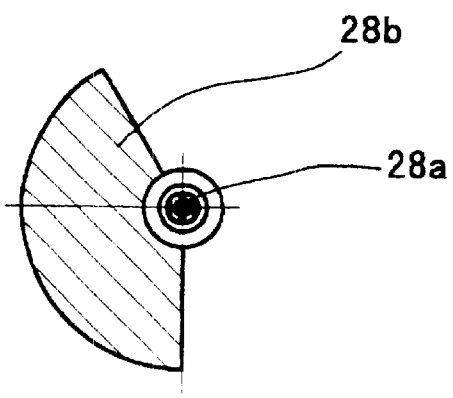
FIG. 14(c) is a cross sectional view thereof seen from the bottom.
Figure 15A:
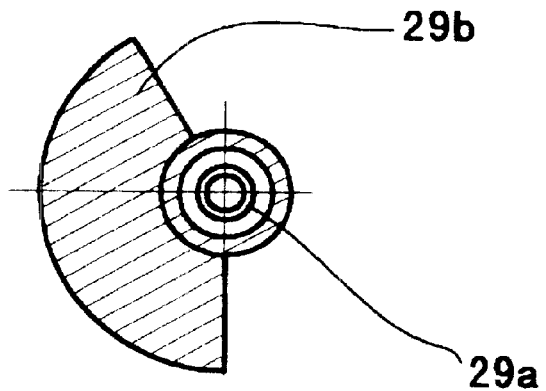
FIG. 15(a) is a cross sectional view of a second vane and a second shaft seen from the top.
Figure 15B:
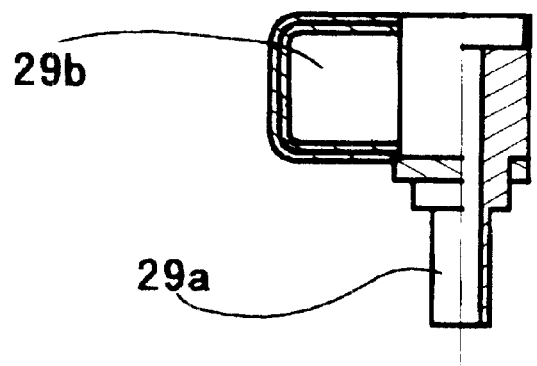
FIG. 15(b) is a front view thereof partly in section.
Figure 15C:
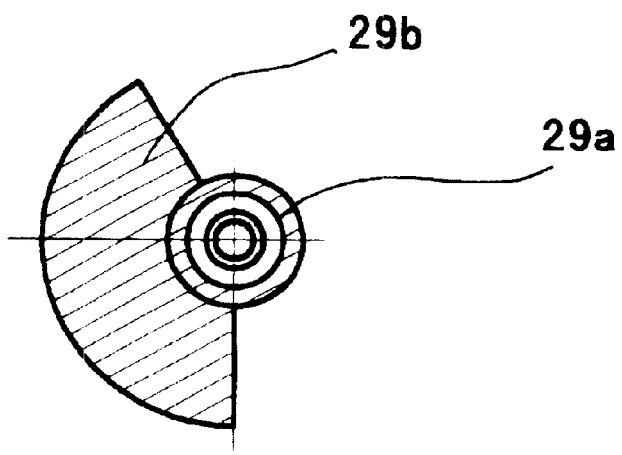
FIG. 15(c) is a cross sectional view thereof seen from the bottom.
Figure 16A:
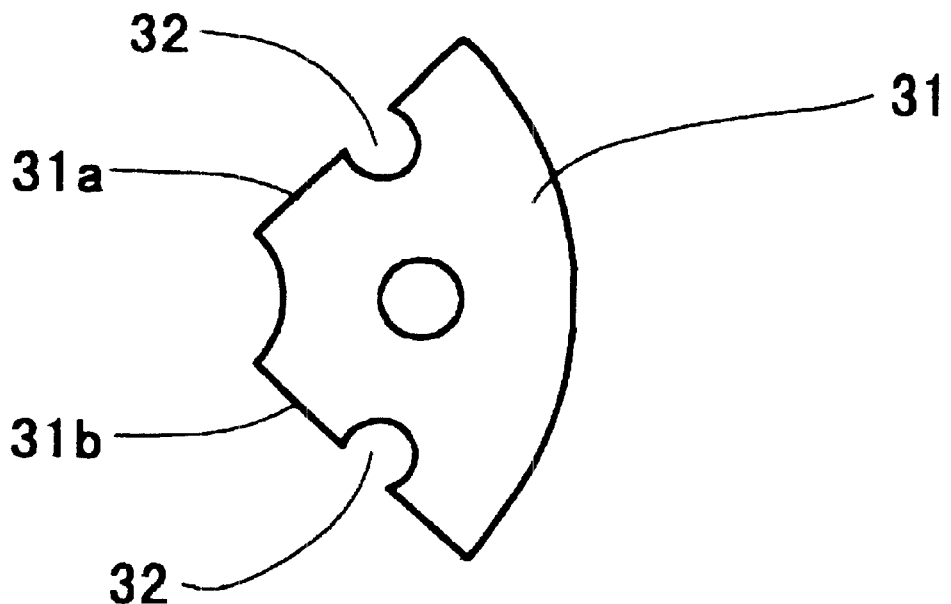
FIG. 16(a) is a plan view of a stopper.
Figure 16B:
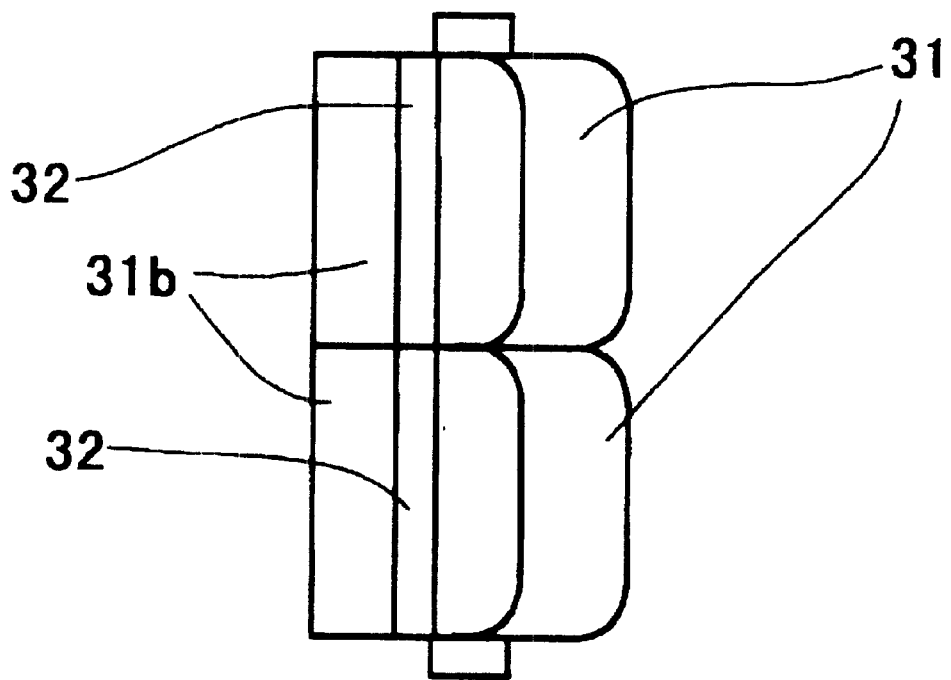
FIG. 16(b) is a front view thereof.
Figure 17A:
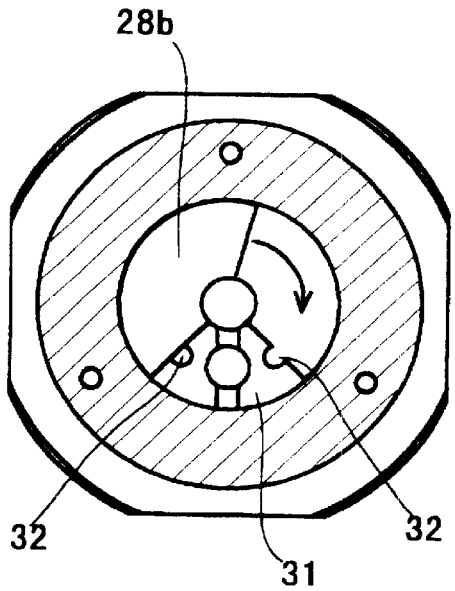
FIGS. 17(a) through (b) shows the rotational movements of vanes.
Figure 17B:
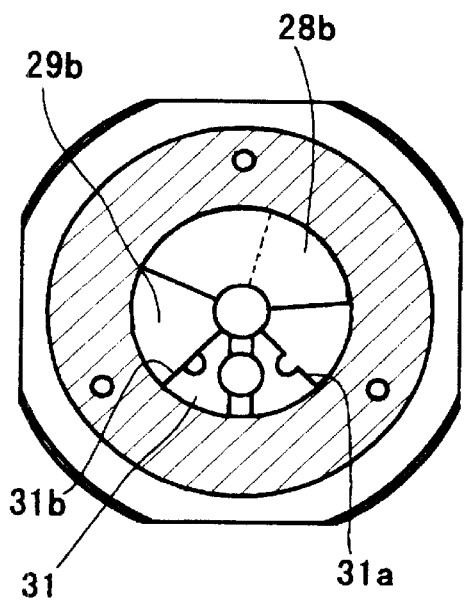
Figure 17C:
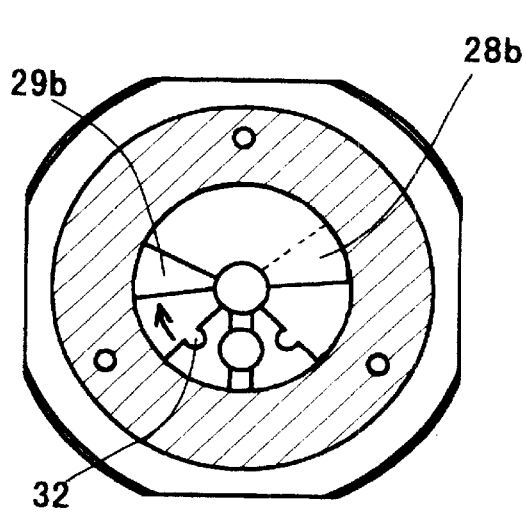
Figure 17D:
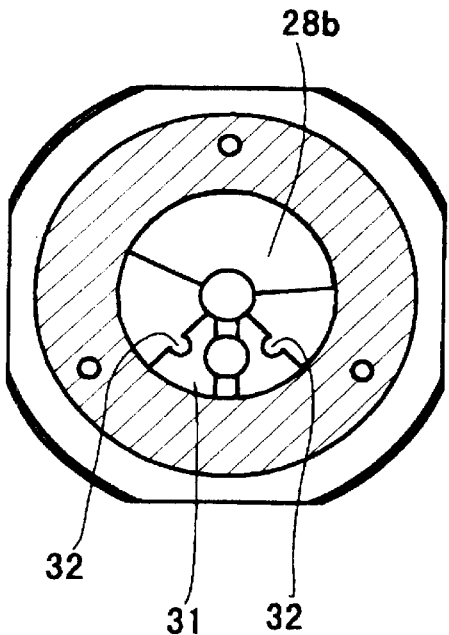

Referring to FIGS. 9 through 11, a further embodiment of jaw driving mechanism is shown. The jaw driving mechanism 27 comprises rotating plates 24a, 24b. The plates 24a, 24b are perpendicularly extended to each other and are coaxially provided at the distal ends of the vane shafts 4a, 5a. Each plate 24a, 24b has opposed curved guide grooves 23. Each guide groove 23 slightly extends from a perimeter side to an inner side of the plates 24a, 24b. The opposed jaws 7,7 have projecting pins 25, 26 that engage the guide grooves 23, 23 of the plates 24a, 24b. When the vane shafts 4a, 5a rotate, two pairs of jaws 7,7 are moved via the pins 25, 26 moving along the guide grooves 23. In accordance with this embodiment, larger clamping torque can be obtained.

Though several embodiments of the jaw driving mechanism are disclosed, it can be understood that other various mechanisms and modifications can be used for the jaw driving mechanism.

Referring to FIG. 12 to FIG. 17, another embodiment of pressure chamber. The first rotary vane actuator 28 and the second rotary vane actuator 29 have a common pressure chamber 30 provided in the casing. The rotary vane actuators 28, 29 include vane shafts 28a, 29a, sector vanes 28b, and 29b respectively and share a sector stopper 31. The vane 28b and the vane 29b are disposed at different elevations in the chamber 30. Slots 32 are provided at both side surfaces 31a, 31b of the sector stopper 31. The slots 32 extend in the vertical direction so that the fluid flows through the slots 32. The jaw driving mechanism 27 of the third embodiment is provided at the distal ends of the vane shafts 28a, 29a.

Referring now to FIG. 17, when the fluid is admitted from the port 13, each vane 28b, 29b moves in the directions of arrows at the same time or a certain time difference whereby the jaw driving mechanism is actuated by the rotations of the vane shafts 28a, 29a. When all of the clamping portions of the four jaws contact the workpiece, high pressure is effected in the chamber 30 so that the four jaws fixedly clamp the workpiece.

What is claimed is:

1. A chuck having a chuck body defining a front face, four radial jaw grooves provided in said front face, two pairs of opposed jaws slidably provided in said jaw grooves, said chuck comprising:
   (a) a first rotary vane actuator having a first vane and a longer first vane. shaft;
   (b) a second rotary vane actuator having a second vane and a shorter second vane shaft;
   (c) said first and second actuators coaxially aligned;
   (d) a distal end of said first vane shaft operatively connected with one pair of the opposed jaws, a distal end of said second vane shaft operatively connected with the other pair of opposed jaws such that the two pairs of opposed jaws are differentially actuated by said first and second rotary vane actuators.

2. The chuck as claimed in claim 1, wherein said first vane shaft is a longer and thinner shaft and said second vane shaft is a shorter and thicker shaft such that said first shaft rotatably extends in a hollow portion of said second shaft.

3. The chuck as claimed in claim 1, wherein said first rotary vane actuator includes a first pressure chamber and said second rotary vane actuator includes a second pressure chamber.

4. The chuck as claimed in claim 3, wherein said first pressure chamber and said second pressure chamber are in fluid communication.

5. The chuck as claimed in claim 4, wherein either one of the rotary vane actuators comprises ports for admitting and/or discharging fluid.

6. The chuck as claimed in claim 4, wherein said first pressure chamber includes an intake opening that communicates with an inlet port and the fluid admitted from said inlet port is introduced into said second pressure chamber.

7. The chuck as claimed in claim 3, wherein said first and second rotary vane actuators comprise ports for admitting and/or discharging fluid respectively.

8. The chuck as claimed in claim 1, wherein said first and second rotary vane actuators comprise a common pressure chamber.

9. The chuck as claimed in claim 8, wherein said first and second vanes are sector members.

10. The chuck as claimed in claim 8, wherein a first vane and a second vane are oppositely spaced in said chamber, and said first and second vanes move in opposite directions by introducing fluid into a room between said first and second vanes.

11. The chuck as claimed in claim 9, wherein said first vane and second vane are offset in said chamber.

12. The chuck as claimed in claim 11, wherein at least one sector stopper is housed in said chamber, and wherein at least one side surface of said stopper is provided with a slot for allowing fluid flow.

13. The chuck as claimed in claim 8, said common pressure chamber comprises ports for admitting and/or discharging fluid.

14. The chuck as claimed in claim 1, wherein said distal ends of the vane shafts engage the opposed jaws via a jaw driving mechanism.

15. The chuck as claimed in claim 12, said driving mechanism comprising:
   (a) two disc cams each having opposed cutouts at a circumference thereof, the cams being coaxially provided at the distal ends of said first and second vane shafts respectively; and
   (b) four pins each projected from each of said jaws, and said pins engaging said cutouts of the disc cams.

16. The chuck as claimed in claim 12, said driving mechanism comprising:
   (a) two spur gears coaxially provided at the distal ends of said first and second vane shafts respectively; and
   (b) four rack gears provided at said four jaws respectively, and said rack gears engaging said spur gears.

17. The chuck as claimed in claim 12, said driving mechanism comprising:
   (a) two plates coaxially provided at the distal ends of said first and second vane shafts respectively, each of said plates having opposed curved guide grooves therein; and
   (b) four pins each projected from each of said jaws, and said pins engaging said guide grooves of the plates.

18. A chuck having four radial jaw grooves, two pairs of opposed jaws movably provided in said grooves, said chuck comprising:
   (a) a first rotary vane actuator having a first vane, a first vane shaft and a first pressure chamber;
   (b) a second rotary vane actuator having a second vane, a second vane shaft and a second pressure chamber;
   (c) said first and second actuators coaxially provided and one said vane shaft rotatably extended in a hollow portion of the other vane shaft;

(d) at least one duct interconnecting said first and second pressure chambers in fluid communication;

(e) an inlet for admitting fluid to said pressure chamber; and (f) said first and second vane shafts operatively connected with either one of the opposed jaws respectively such that the two pairs of opposed jaws are differentially actuated by said first and second rotary vane actuators.

19. A chuck having four radial jaw grooves, two pairs of opposed jaws movably provided in said grooves, said chuck comprising:

(a) a first rotary vane actuator having a first sector vane and a first vane shaft;

(b) a second rotary vane actuator having a second sector vane and a second vane shaft;

(c) said first and second actuators coaxially provided and one said vane shaft rotatably extended in a hollow portion of the other vane shaft, (d) a common pressure chamber, said chamber partitioned by said first and second vanes and a sector stopper;

(e) at least one fluid-conducting path provided between said stopper and said vanes;

(f) an inlet for admitting fluid to said pressure chamber; and (g) said first and second vane shafts operatively connected with either one of the opposed jaws respectively such that the two pairs of opposed jaws are differentially actuated by said first and second rotary vane actuators.

20. A chuck having four radial jaw grooves, two pairs of opposed jaws movably provided in said grooves, said chuck comprising:

(a) a first rotary vane actuator for actuating one pair of said opposed jaws, and a second rotary actuator for actuating the other pair of said opposed jaws;

(b) an inlet for admitting fluid, and an outlet for discharging fluid;

(c) said first and second vane actuators operated by the fluid admitted from said inlet such that the two pairs of opposed jaws are differentially actuated by said first and second rotary vane actuators.

21. The chuck as claimed in claim 20, wherein clamping force is exerted after the four jaws contact a workpiece.

* * * * *

UNITED STATES PATENT AND TRADEMARK OFFICE
CERTIFICATE OF CORRECTION

PATENT NO. : 6,460,862 B1
DATED : October 8, 2002
INVENTOR(S) : T. Shimizu

It is certified that error appears in the above-identified patent and that said Letters Patent is hereby corrected as shown below:

Column 5,
Line 50, "vane. shaft;" should read -- vane shaft, --

Column 7,
Line 19, "shaft," should read -- shafts; --

Signed and Sealed this

Fourth Day of November, 2003

JAMES E. ROGAN
*Director of the United States Patent and Trademark Office*